(12) United States Patent
Hara (10) Patent No.: US 9,434,233 B2
(45) Date of Patent: Sep. 6, 2016

(54) VEHICULAR AIR CONDITIONER

(75) Inventor: Junichiro Hara, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 278 days.

(21) Appl. No.: 13/545,350

(22) Filed: Jul. 10, 2012

(65) Prior Publication Data

US 2013/0014912 A1    Jan. 17, 2013

(30) Foreign Application Priority Data

Jul. 13, 2011    (JP) .................................. 2011-155068

(51) Int. Cl.
*B60H 1/00* (2006.01)

(52) U.S. Cl.
CPC ..... *B60H 1/00678* (2013.01); *B60H 2001/006* (2013.01); *B60H 2001/00714* (2013.01)

(58) Field of Classification Search
CPC .......... B60H 1/00664; B60H 1/00671; B60H 1/00692; B60H 1/00514; B60H 1/00678; B60H 2001/00714; B60H 2001/006
USPC .................... 165/42, 43; 454/121, 126, 156; 237/12.3 A, 12.3 B
See application file for complete search history.

(56) References Cited

U.S. PATENT DOCUMENTS

| | | | |
|---|---|---|---|
| 5,699,851 A * | 12/1997 | Saida et al. ...................... | 165/42 |
| 6,508,703 B1 * | 1/2003 | Uemura ............. | B60H 1/00692 251/901 |
| 6,758,738 B1 * | 7/2004 | Keller ............................. | 454/69 |
| 8,302,674 B2 * | 11/2012 | Kim et al. ..................... | 165/202 |
| 2002/0025772 A1 * | 2/2002 | Egami et al. .................. | 454/121 |
| 2003/0171091 A1 * | 9/2003 | Uemura ............. | B60H 1/00692 454/156 |
| 2004/0069444 A1 * | 4/2004 | Clifford .......................... | 165/42 |

(Continued)

FOREIGN PATENT DOCUMENTS

| | | |
|---|---|---|
| CN | 201368566 Y | 12/2009 |
| JP | 62-48809 U | 3/1987 |

(Continued)

OTHER PUBLICATIONS

International Search Report of PCT/JP2012/066693, dated Sep. 4, 2012.

(Continued)

*Primary Examiner* — Tho V Duong
*Assistant Examiner* — Raheena Rehman
(74) *Attorney, Agent, or Firm* — Westerman, Hattori, Daniels & Adrian, LLP (57) ABSTRACT

A vehicular air conditioner capable of reducing high-frequency sounds generated when an air mix damper is slightly opened and finely adjusting the temperature around the maximum heating position for improving the temperature controllability is provided. The vehicular air conditioner including an air mix damper that adjusts a flow rate of air delivered into a heating passage including a heater core after being passed through an evaporator and a flow rate of air delivered into a bypass passage that bypasses the heater core. In the vehicular air conditioner, a plurality of asperity portions are formed on a distal-end-side surface of the damper in the width direction of the damper, at which the damper is in contact with a seal surface on a unit case at the maximum heating position, and an elastic insulator having a predetermined thickness is attached to the asperity portions to form asperities similar thereto.

4 Claims, 5 Drawing Sheets

(56) References Cited

U.S. PATENT DOCUMENTS

| | | | |
|---|---|---|---|
| 2004/0159420 A1* | 8/2004 | Goupil et al. | 165/68 |
| 2006/0025063 A1* | 2/2006 | Burr et al. | 454/69 |
| 2006/0144582 A1* | 7/2006 | Sekiya et al. | 165/202 |
| 2006/0252362 A1* | 11/2006 | Ito et al. | 454/156 |
| 2009/0093207 A1* | 4/2009 | Han et al. | 454/155 |
| 2010/0144263 A1* | 6/2010 | Han | B60H 1/00678 454/155 |
| 2010/0224253 A1 | 9/2010 | Azar et al. | |
| 2012/0180393 A1* | 7/2012 | Suzuki | B60H 1/00692 49/348 |

FOREIGN PATENT DOCUMENTS

| | | |
|---|---|---|
| JP | 2-32409 U | 2/1990 |
| JP | 4-123709 U | 11/1992 |
| JP | 7-28711 U | 5/1995 |
| JP | 8-230452 A | 9/1996 |
| JP | 9-300943 A | 11/1997 |
| JP | 2000-71744 A | 3/2000 |
| JP | 2003-312233 A | 11/2003 |
| JP | 2006-182245 A | 7/2006 |
| JP | 2008-183917 A | 8/2008 |
| JP | 4337179 B2 | 9/2009 |
| JP | 4396226 B2 | 1/2010 |
| JP | 4600143 B2 | 12/2010 |
| JP | 2011-11584 A | 1/2011 |

OTHER PUBLICATIONS

Written Opinion of the International Search Authority of PCT/JP2012/066693, dated Sep. 4, 2012.

Office Action dated Mar. 25, 2015, issued in corresponding Chinese Patent Application No. 201280015985.4 with English translation (14 pages).

Notification on the Grant of Patent Right for Invention dated Sep. 10, 2015, issued in counterpart Chinese Patent Application No. 201280015985.4, with English translation (4 pages).

Decision to grant a Patent dated Nov. 24, 2015, issued in counterpart Japanese Patent Application No. 2011-155068 (3 pages). Concise explanation of relevancy—"The Decision to Grant a Patent has been received."

* cited by examiner

VEHICULAR AIR CONDITIONER

CROSS-REFERENCE TO RELATED APPLICATIONS

This application is based on Japanese Patent Application No. 2011-155068, the contents of which are incorporated herein by reference.

TECHNICAL FIELD

The present invention relates to an air-mix type vehicular air conditioner including an air mix damper.

BACKGROUND ART

In a vehicular air conditioner including an air mix damper that adjusts a flow rate of air delivering to a heater core through an evaporator and a flow rate of air bypassing the heater core through the evaporator, the temperature is adjusted by rotating the air mix damper at an appropriate position between the maximum cooling position (MAX COOL position) and the maximum heating position (MAX HOT position). In such an air-mix type vehicular air conditioner, the pressure loss of air flow paths is larger at the heating side than the cooling side. The opening degree needs to be adjusted precisely for controlling the temperature around the maximum heating position.

It is known that when the air mix damper is slightly opened to a slight opening degree from the maximum heating position for controlling the temperature, air is delivered into a gap provided by the slight opening having a high aspect ratio, and accordingly, a stable vortex street is generated. Due to the vortex street, dissonant high-frequency sounds (commonly known as whistling) are generated. Since the high-frequency sounds are transmitted to a cabin with temperature-conditioned air through a blowing port, a feeling of unpleasantness is given to occupants. Thus, for minutely controlling the flow rate while preventing the occurrence of the high-frequency sounds when the air mix damper is slightly opened, it is proposed that a plurality of asperities are formed on the distal end of the air mix damper. It is also proposed that a pair of seal lips for closing a gap between the air mix damper and a seal surface of a unit case are provided and asperities are formed on the distal ends of the seal lips (for example, see Patent Literatures 1 to 3).

CITATION LIST

Patent Literature

{PTL 1}
Japanese Patent No. 4337179
{PTL 2}
Japanese Patent No. 4396226
{PTL 3}
Japanese Unexamined Patent Application, Publication No. 2011-11584

SUMMARY OF INVENTION

Technical Problem

As disclosed in Patent Literatures 1 to 3, the vortex street generated by air flowing into the gap generated when the air mix damper is slightly opened is disturbed by the asperities formed on the distal end of the air mix damper. The vortex street becomes unstable, and accordingly, the occurrence of the high-frequency sounds can be reduced. Reduction of the high-frequency sounds can be obtained to some extent only by forming the asperities on the distal end of the air mix damper. When the air mix damper is slightly opened, however, the controllability of the temperature around the maximum heating position where the fine adjustment of the opening degree is required is not improved.

When the asperities are formed on the distal end of the air mix damper, the asperities effectively disturb the vortex street, but do not considerably affect the opening degree of the air mix damper which is decided by the small gap between the distal end surface of the air mix damper and the seal surface of the unit case. Accordingly, the fine adjustment of the temperature around the maximum heating position is difficult, and the temperature is largely varied by slight change of the opening degree of the air mix damper. Thus, the improvement of the temperature controllability has been desired.

An object of the present invention, which has been accomplished under the above-mentioned circumstances, is to provide a vehicular air conditioner capable of reducing high-frequency sounds generated when an air mix damper is slightly opened and finely adjusting the temperature around the maximum heating position for improving the temperature controllability.

Solution to Problem

To solve the above-mentioned problem, a vehicular air conditioner according to the present invention employs the following solutions.

A vehicular air conditioner according to an aspect of the present invention includes an air mix damper that adjusts a flow rate of air delivered into a heating passage including a heater core after being passed through an evaporator and a flow rate of air delivered into a bypass passage that bypasses the heater core, in which a plurality of asperity portions are formed on a distal-end-side surface of the damper in the width direction of the air mix damper, at which the air mix damper is in contact with a seal surface on a unit case at a maximum heating position, and an elastic insulator having a predetermined thickness is attached to the asperity portions to form asperities similar thereto.

According to the aspect of the present invention, in the air-mix type vehicular air conditioner including the air mix damper, the plurality of asperity portions are formed on the distal-end-side surface of the damper in the width direction of the air mix damper, at which the air mix damper is in contact with the seal surface on the unit case at the maximum heating position. Furthermore, the elastic insulator having the predetermined thickness is attached to the asperity portions to form the asperities similar thereto. Thus, even when the temperature around the maximum heating position (MAX HOT position) is controlled by the sight opening degree of the air mix damper, a vortex street generated by air flowing into the gap of the slight opening is disturbed by the plurality of asperities formed on the distal-end-side surface and is destabilized. Thus, dissonant high-frequency sounds (whistling), which are generated by the stable vortex street caused by the air delivered into the gap (gap having a high aspect ratio) when the air mix damper is slightly opened, are reduced. Consequently, the feeling of unpleasant caused by the high-frequency sounds can be eliminated. Since the elastic insulator attached to form the asperities is in contact with the seal surface on the unit case and the gap is gradually increased or decreased by compressing the asperities, the opening degree can be adjusted more precisely. Since the bypass flow (cool air) delivered through the distal-end-side surface of the air mix damper is agitated by the asperities and then its flow rate is changed, the air is mixed effectively. Thus, the temperature around the maximum heating position can be finely adjusted, and the controllability of the temperature can be improved. For example, the temperature difference during a defrost/foot mode can be eliminated.

In the vehicular air conditioner according to the aspect of the present invention, at least two lines of the asperity portions on the distal-end-side surface of the air mix damper may be provided at predetermined intervals in a direction of air flow, and a protrusion provided on the seal surface on the unit case may be contactable with a portion between the lines.

According to the aspect of the present invention, at least two lines of the asperity portions on the distal-end-side surface of the air mix damper are provided at the predetermined intervals in the direction where the air flows, and the protrusion provided on the seal surface on the unit case is contactable with the portion between the lines. Accordingly, even when the elastic insulator is provided on the damper distal-end-side surface that is in contact with the seal surface of the unit case at the maximum heating position, the protrusion on the seal surface of the unit case that is in contact with the elastic insulator is in contact with the elastic insulator between the lines of the asperity portions. Thus, the asperities on the elastic insulator can be easily deformed. Thus, without increasing the operational force of the air mix damper during the deformation of the elastic insulator, the gap can be gradually increased or decreased by compressing the asperities. Thus, the controllability of the temperature when the air mix damper is slightly opened can be improved.

In the vehicular air conditioner according to the aspect of the present invention, the thickness of the elastic insulator may be larger than the vertical difference of the asperity portions formed on the distal-end-side surface of the air mix damper.

According to the aspect of the present invention, the thickness of the elastic insulator is larger than the vertical difference of the asperity portions formed on the distal-end-side surface of the air mix damper. Accordingly, the deformability of the elastic insulator that is deformed by being brought into contact with the seal surface of the unit case is sufficiently ensured. Without increasing the operational force of the air mix damper during the deformation of the elastic insulator, the asperities are compressed and the gap can be gradually increased or decreased within that range. Thus, the controllability of the temperature when the air mix damper is slightly opened can be enhanced, and the temperature around the maximum heating position can be finely adjusted.

In the vehicular air conditioner according to the aspect of the present invention, the thickness of the elastic insulator may be at least twice as large as the vertical difference of the asperity portions.

According to the aspect of the present invention, the thickness of the elastic insulator is at least twice as large as the vertical difference of the asperity portions. Thus, the elastic insulator is deformed easily and its deformability is sufficiently ensured. Without increasing the operational force of the air mix damper during the deformation, the asperities are compressed and the gap is gradually increased or decreased within that range. Consequently, the controllability of the temperature when the air mix damper is slightly opened can be enhanced, and the temperature around the maximum heating position can be finely adjusted.

Advantageous Effects of Invention

According to the present invention, even when the temperature around the maximum heating position (MAX HOT position) is controlled by the sight opening degree of the air mix damper, the vortex street generated by air flowing into the gap of the slight opening is disturbed by the plurality of asperities formed on the distal-end-side surface and is destabilized. Thus, the dissonant high-frequency sounds (whistling), which are generated by the stable vortex street caused by the air delivered into the gap (gap having a high aspect ratio) when the air mix damper is slightly opened, are reduced. Consequently, the feeling of unpleasant caused by the high-frequency sounds can be eliminated. Since the elastic insulator attached to form the asperities is in contact with the seal surface on the unit case and the gap is gradually increased or decreased by compressing the asperities, the opening degree can be adjusted more precisely. Since the bypass flow (cool air) delivered through the distal-end-side surface of the air mix damper is agitated by the asperities and then its flow rate is changed, the air is mixed effectively. Thus, the temperature around the maximum heating position can be finely adjusted, and the controllability of the temperature can be improved. For example, the temperature difference during the defrost/foot mode can be eliminated.

DESCRIPTION OF EMBODIMENTS

An embodiment of the present invention will be explained below with reference to FIGS. 1 to 5C.

Figure 1:
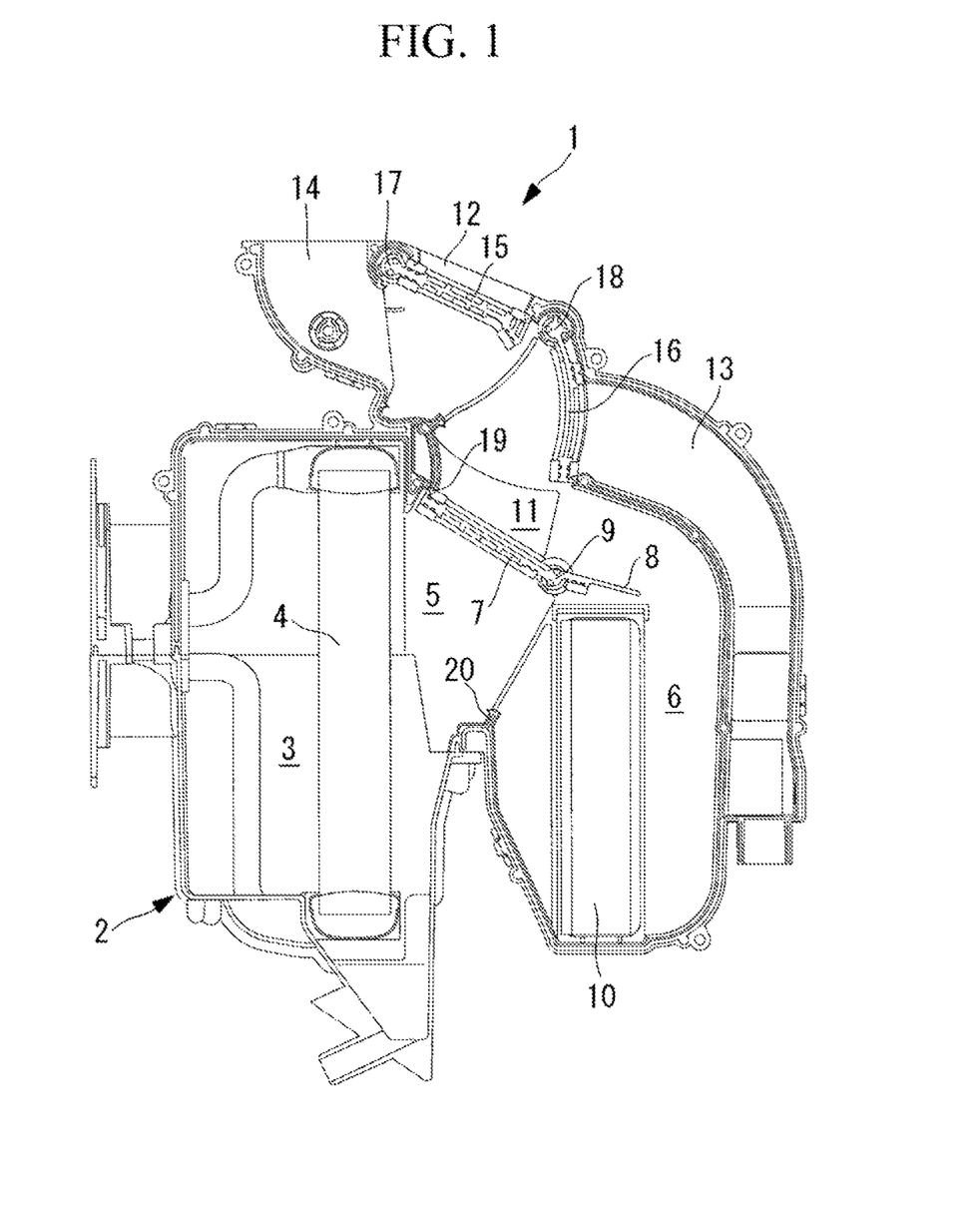
FIG. 1 is a longitudinal sectional view showing a vehicular air conditioner according to an embodiment of the present invention.
Figure 2:
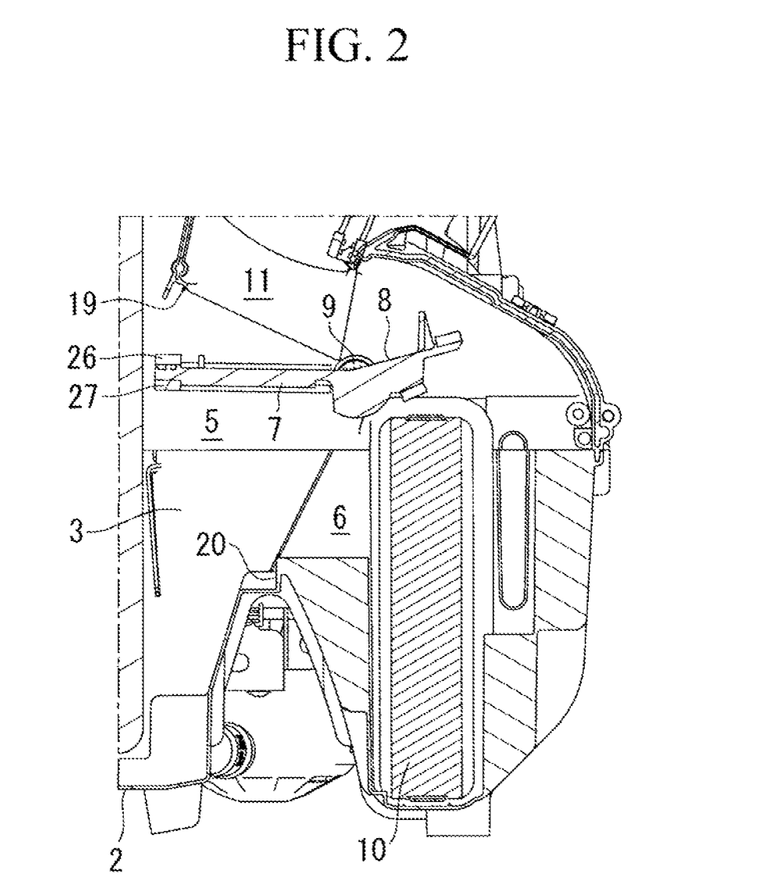
FIG. 2 is a longitudinal sectional view showing an air mix damper and its surrounding area in the vehicular air conditioner shown in FIG. 1.
Figure 3A:
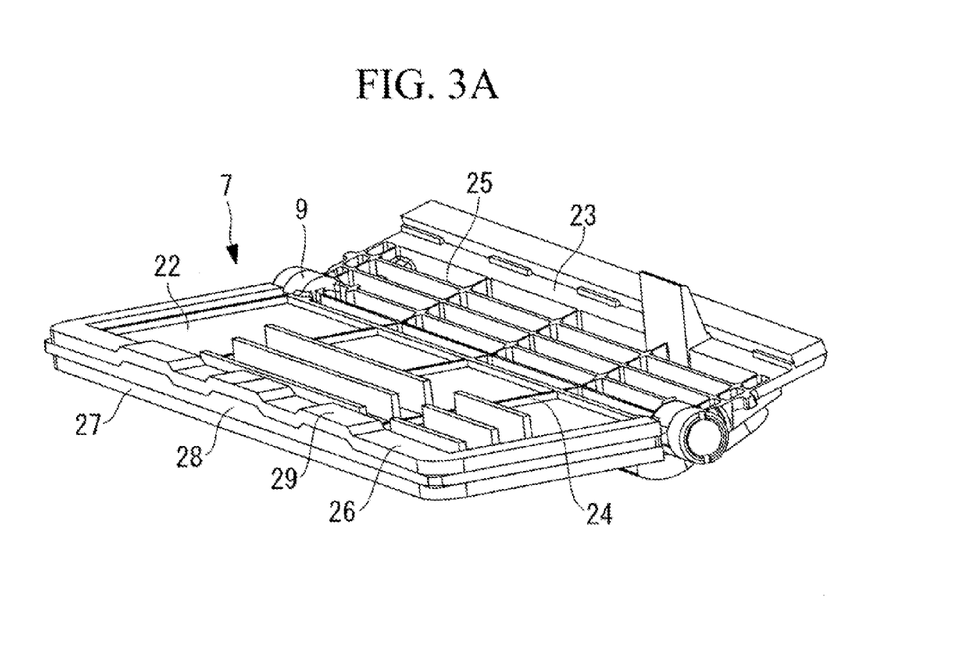
FIG. 3A is a perspective view showing the air mix damper used in the vehicular air conditioner shown in FIG. 1.
Figure 3B:
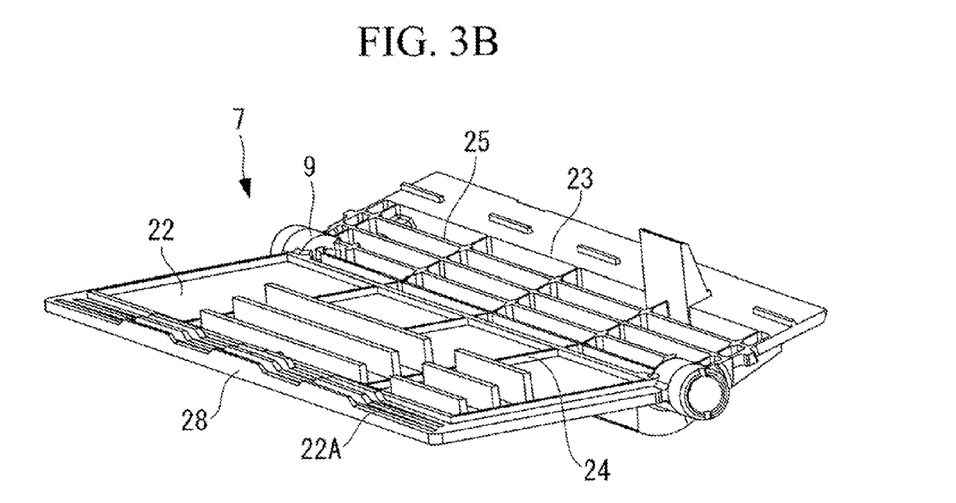
FIG. 3B is a perspective view showing the air mix damper used in the vehicular air conditioner shown in FIG. 1, from which an elastic insulator of the air mix damper is removed.

FIG. 1 is a longitudinal sectional view showing a vehicular air conditioner according to the embodiment of the present invention; FIG. 2 is a longitudinal sectional view showing an air mix damper and its surrounding area; and FIGS. 3A and 3B are perspective views showing the configuration of the air mix damper.

The vehicular air conditioner (HVAC unit: heating ventilation and air conditioning unit) 1 includes a resin unit case 2 to which a blower unit (not shown) is connected. The unit case 2 includes an air passage 3 that changes the flow of air delivered from the blower unit (not shown) provided on the side of the unit case 2 to the front-back direction (the horizontal direction in FIG. 1) and delivers the air downwardly.

An evaporator 4, which constitutes a refrigeration cycle (not shown), is disposed to be approximately vertical on the upstream side of the air passage 3. The air passage 3 is branched into a bypass passage 5 and a heating passage 6 on the downstream side of the evaporator 4. As shown in FIG. 3, an air mix damper 7 is integrally provided with a sub damper 8 across a rotational shaft 9, and is rotatable around the rotational shaft 9 at the branch point where the passage is branched into the bypass passage 5 and the heating passage 6. The air mix damper 7 can adjust the flow rate of air delivered into the bypass passage 5 and the heating passage 6. A heater core 10 is disposed to be approximately vertical in the heating passage 6. In the heater core 10, cooling water can circulate from an engine cooling water circuit (not shown).

The bypass passage 5 and the heating passage 6 are joined together in an air mix region 11 on the downstream side of the air mix damper 7, and are communicated with three supply passages of a face supply passage 12, a foot supply passage 13, and a defrost supply passage 14. A defrost/face damper 15 for switching a supplying mode is provided between the face supply passage 12 and the defrost supply passage 14. A foot damper 16 for switching the supplying mode is provided at the inlet of the foot supply passage 13.

As shown in FIG. 1, the defrost/face damper 15 is rotatable around a rotational shaft 17 between the position where the face supply passage 12 is completely closed and the position where the defrost supply passage 14 is completely closed, while the foot damper 16 is rotatable around the rotational shaft 18 between the position where the foot supply passage 13 is completely closed and the position where the passage connected to the face supply passage 12 and the defrost supply passage 14 is completely closed. The defrost/face damper 15 and the foot damper 16 are rotatable to a supply mode position selected by a link mechanism (not shown) composed of a lever and link connected to the shaft ends of the rotational shafts 17 and 18.

The defrost/face damper 15 and the foot damper 16 are opened and closed to selectively switch between five modes of supplying the temperature-conditioned air into the cabin: a face mode in which the temperature-conditioned air is supplied from the face supply passage 12; a bi-level mode in which the temperature-conditioned air is supplied from the face supply passage 12 and the foot supply passage 13; a root mode in which the temperature-conditioned air is supplied from the foot supply passage 13; a defrost/foot mode in which the temperature-conditioned air is supplied from the foot supply passage 13 and the defrost supply passage 14; and a defrost mode in which the temperature-conditioned air is supplied from the defrost supply passage 14.

Figure 4:
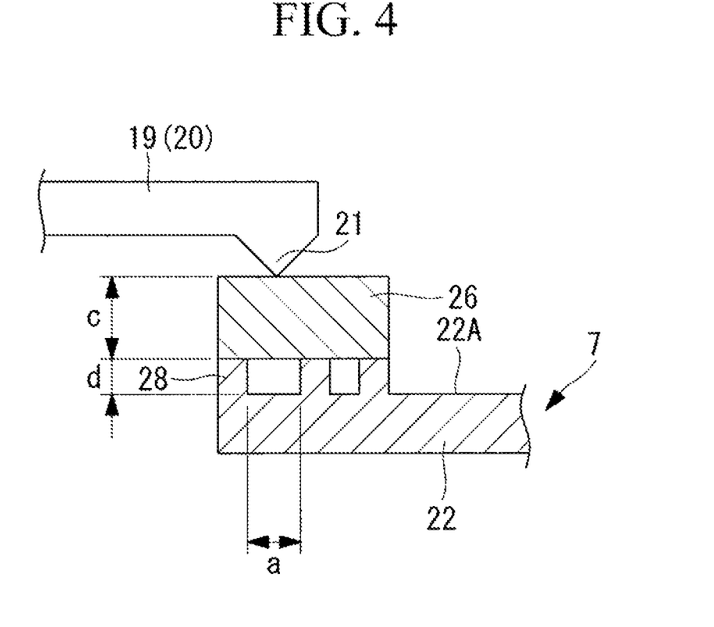
FIG. 4 is a partially enlarged cross-sectional view showing a condition of the air mix damper, which is used in the vehicular air conditioner shown in FIG. 1, around the maximum heating position.

As described above, the air mix damper 7 includes the rotational shaft 9 that is rotatably supported by the unit case 2 on the upper portion of the heater core 10 where the air passage is branched into the bypass passage 5 and the heating passage 6, and is rotatable between upper and lower seal surfaces 19 and 20 provided on the unit case 2. The seal surface 19 is brought into contact with the air mix damper 7 at the maximum heating position (MAX HOT position), and the seal surface 20 is brought into contact with the air mix damper 7 at the maximum cooling position (MAX COOL position). As shown in FIG. 4, each of the seal surfaces 19 and 20 includes a protrusion 21.

As shown in FIGS. 3A and 3B, the air mix damper 7 is integrally made of a resin material, in which a number of ribs 24 and 25 are integrally formed in the longitudinal and lateral directions on surfaces of a damper 22 and sub-damper 23 that are shaped like a plate having a predetermined thickness, and the rotational shaft 9 is integrally formed between the damper 22 and sub-damper 23. Elastic insulators 26 and 27 made of foamed polyurethane are attached to the front and rear surfaces of the side close to the distal end of the damper 22 and the right and left sides which are brought into contact with the seal surfaces 19 and 20 on the unit case 2 via the elastic insulators 26 and 27.

Especially, as shown in FIG. 3B, the distal-end-side surface 22A of the damper 22, at which the air mix damper 7 is in contact with the seal surface 19 at the maximum heating position (MAX HOT position), includes a plurality of asperity portions 28 in the width direction of the air mix damper 7. Two or more lines (three lines in this embodiment) of the asperity portions 28 are integrally formed at predetermined intervals in the front-back direction where the air flows. The elastic insulator 26 is attached to the surface of the asperity portions 28 to form asperities 29 similar thereto. As shown in FIG. 4, in the three lines of asperity portions 28 in the front-back direction where the air flows, an interval "a" between the first line and the second line is set to have a dimension so that the protrusion 21 provided on the seal surface 19 is contactable with the portion corresponding to the interval. Accordingly, the air is effectively interrupted.

The thickness "c" of the elastic insulator 26 attached to the surface of the asperity portions 28 is larger than the vertical interval "d" of the asperity portion 28, i.e., the dimensional difference "d" in the height direction between the top of the projecting portion and the bottom of the recessed portion of the asperity 28 (c>d). When the elastic insulator 26 is brought into contact with the seal surface 19 and is compressed to be deformed, its state is changed from the state shown in FIG. 5B to the state shown in FIG. 5C. The gap between the seal surface 19 and the air mix damper 7 is gradually adjusted until the asperities 29 are vanished and there is no gap. It is desirable that the thickness "c" of the elastic insulator 26 is twice or more as large as the vertical difference D of the asperity portion 28 in order to ensure a desirable amount of compressional deformation.

The following advantageous effects can be obtained due to the structure as described above according to the embodiment.

The air delivered into the air passage 3 in the HVAC unit 1 from the blower unit (not shown) is heat-exchanged with the refrigerant to be cooled when being passed through the evaporator 4. Then, the airflow is branched into the bypass passage 5 and the heating passage 6 in accordance with the rate of flow adjusted by the air mix damper 7. The air delivered into the heating passage 6 is heat-exchanged with hot water to be heated when being passed through the heater core 10, and is mixed with cold air bypassing the heater core 10 in the air mix region 11 on the downstream side of the air mix damper 7, so that the temperature of the air is adjusted.

This temperature-conditioned air is selectively supplied into the cabin from at least one of the face supply passage 12, the foot supply passage 13, and the defrost supply passage 14 in accordance with the supply mode such as the face mode, foot mode, defrost mode, defrost/foot mode, and bi-level mode, that are switched by the opening and closing of the defrost/face damper 15 and the foot damper 16 for switching the supply modes. Then, the temperature-conditioned air is used for conditioning the air inside the cabin.

When the temperature is controlled by adjusting the opening degree of the air mix damper 7, the temperature is considerably varied by the slight change of the rotational angle of the air mix damper 7 especially around the maximum heating position (MAX HOT position). Thus, the fine adjustment of the opening degree of the air mix damper 7 is required. When the air mix damper 7 is controlled to a slightly opened position from the maximum heating position, the air is delivered into the gap and the vortex street is stably formed. Accordingly, high-frequency sounds (so-called whistling) may be generated.

According to the embodiment, the distal-end-side surface 22A of the damper, at which the air mix damper 7 is in contact with the seal surface 19 on the unit case 2 at the maximum heating position, includes the plurality of asperity portions 28 in the width direction of the air mix damper 7. The elastic insulator 26 having a predetermined thickness is attached to the asperity portions 28 to form the asperities 29 similar thereto. Therefore, even when the temperature around the maximum heating position is controlled by the slight opening degree of the air mix damper 7, the vortex street generated by the air delivered into the gap of the slight opening is disturbed by the plurality of asperities 29 formed on the distal-end-side surface 22A and is destabilized. Thus, the dissonant high-frequency sounds (whistling), which are generated by the stable vortex street caused by the air delivered into the gap when the air mix damper 7 is slightly opened, are reduced. Consequently, the feeling of unpleasant given to occupants caused by the high-frequency sounds transmitted to the cabin can be eliminated.

Figure 5A:
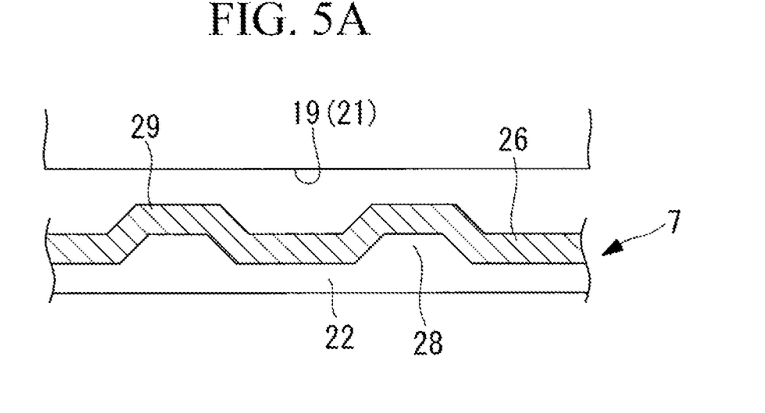
FIG. 5A is a schematic view showing a changing state of the air mix damper shown in FIG. 4 around the maximum heating position when the air mix damper is slightly opened.
Figure 5B:
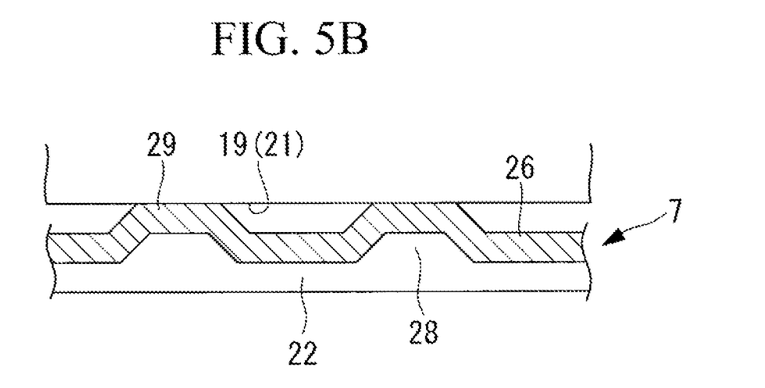
FIG. 5B is a schematic view showing a changing state of the air mix damper shown in FIG. 4 around the maximum heating position when the air mix damper is slightly opened.
Figure 5C:
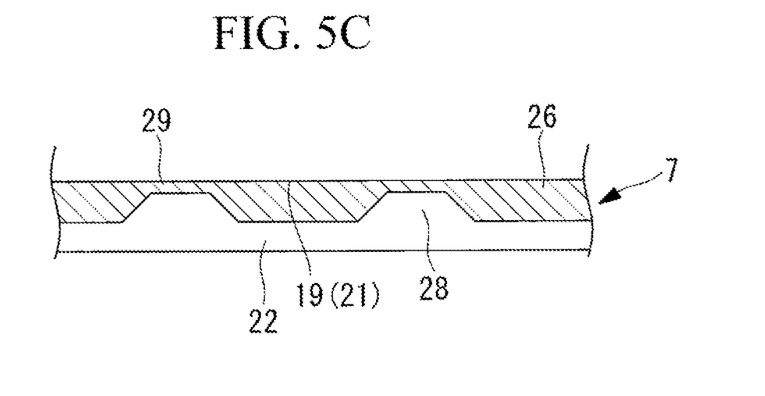
FIG. 5C is a schematic view showing a changing state of the air mix damper shown in FIG. 4 around the maximum heating position when the air mix damper is slightly opened.

As shown in FIGS. 5A to 5C, the elastic insulator 26 attached to form the asperities 29 is in contact with the seal surface 19 on the unit case 2 when the air mix damper 7 is controlled to be slightly opened. The gap is gradually increased and decreased by compressing the asperities 29. Accordingly, the opening degree can be adjusted more precisely. Furthermore, the bypass flow (cool air) delivered through the distal-end-side surface of the air mix damper 7 is agitated by the asperities 29, and then its flow rate is changed. Accordingly, the air is mixed effectively in the air mix region 11. Thus, the temperature around the maximum heating position can be finely adjusted, and the controllability of, the temperature can be enhanced. For example, the temperature difference during the defrost/foot mode can be eliminated.

As shown in FIG. 4, at least two lines (three lines in the embodiment) of the asperity portions 28 formed on the distal-end-side surface 22A of the air mix damper 7 are provided at the predetermined intervals in the direction where the air flows. The protrusion 21 formed on the seal surface 19 of the unit case 2 is contactable with the portion between the lines, so that the air flow between the air mix damper 7 and the seal surface 19 can be interrupted.

Even when the elastic insulator 26 is provided to form the asperities 29 on the distal-end-side surface 22A of the air mix damper 7 that is in contact with the seal surface 19 of the unit case 2 at the maximum heating position, the protrusion 21 on the seal surface 19 of the unit case 2 that is in contact with the elastic insulator 26 is brought into contact with the elastic insulator 26 between the two or more lines of the asperity portions 28. Accordingly, the asperities 29 on the elastic insulator 26 can be easily deformed. Thus, without increasing the operational force of the air mix damper 7 during the deformation of the elastic insulator, the gap can be gradually increased or decreased by compressing the asperities 29. Consequently, the controllability of the temperature when the air mix damper 7 is slightly opened can be enhanced.

As shown in FIG. 4, the thickness "c" of the elastic insulator 26 is larger than the vertical difference "d" of the asperity 28 provided on the distal-end-side surface 22A of the air mix damper 7 according to this embodiment. Therefore, the deformability of the elastic insulator 26 that is deformed by being brought into contact with the seal surface 19 of the unit case 2 is sufficiently ensured. Without increasing the operational force of the air mix damper 7 during the deformation of the elastic insulator 26, the asperities 29 are compressed and the gap can be gradually increased or decreased. Thus, the controllability of the temperature when the air mix damper 7 is slightly opened can be enhanced, and the temperature around the maximum heating position can be finely adjusted.

It is desirable that the thickness "c" of the elastic insulator 26 is at least twice as large as the vertical difference "d" of the asperity 28 because the elastic insulator 26 can be deformed more easily and the deformability can be sufficiently ensured. Therefore, without increasing the operational force of the air mix damper 7 when the elastic insulator 26 is deformed and the cool air flow is interrupted, the asperities 29 are compressed and the gap is gradually increased or decreased. Thus, the controllability of the temperature when the air mix damper 7 is slightly opened can be improved, and the temperature around the maximum heating position can be finely adjusted.

The present invention is not limited to this embodiment, and various modifications are possible without departing from the sprit and scope of the present invention. For example, the air mix damper 7 according to the embodiment is a damper shaped like a butterfly, but may be a damper shaped like a door that does not have the sub-damper 8. Furthermore, the arrangement of the evaporator 4 and the heater core 10 and the arrangement and number of the plurality of supply mode switches 15 and 16 are not limited to those according to this embodiment, and can be changed.

According to this embodiment, an example was described in which the asperity portions 28 are formed on the distal-end-side surface 22A of the air mix damper 7 that is in contact with the seal surface 19 at the maximum heating position, and the elastic insulator 26 is attached to the asperity portions 28 to form the asperities 29 similar thereto. However, it should be noted that the present invention is not limited thereto and includes another embodiment in which similar asperities are formed on the elastic insulator 27 attached to the rear surface on the distal-end side of the air mix damper 7 that is in contact with the seal surface 20 at the maximum heating position.

REFERENCE SIGNS LIST 1 vehicular air conditioner (HVAC unit)
2 unit case
4 evaporator
5 bypass passage
6 heating passage
7 air mix damper
10 heater core
19 seal surface
21 protrusion
22A distal-end-side surface of the damper
26 elastic insulator 28 asperity portion
29 asperity
a interval between lines of asperity portions
c thickness of elastic insulator
d vertical difference of asperity portions

The invention claimed is:

1. A vehicular air conditioner, comprising a unit case and an air mix damper that is disposed in the unit case and that adjusts a flow rate of air delivered into a heating passage including a heater core after being passed through an evaporator and a flow rate of air delivered into a bypass passage that bypasses the heater core, wherein a distal end portion of the air mix damper is in contact with a seal surface of the unit case, the distal end portion has a plurality of asperity portions which are formed on a surface thereof which is in contact with the seal surface of the unit case at a maximum heating position, and are disposed along the width direction of the air mix damper transverse to a direction of air flow, wherein an elastic insulator having a predetermined thickness, which is attached along the asperity portions and which forms asperities similar to the asperity portions at a side thereof which exists prior to coming in contact with the seal surface of the unit case, wherein where the elastic insulator is in contact with the seal surface on the unit case, a gap is created between a portion of the seal surface and two adjacent asperity portions of the elastic insulator, and wherein the gap is decreased by compressing the elastic insulator between a projecting portion of the asperity portion and the seal surface, wherein, when the elastic insulator is brought in contact with the seal surface at the movement to the maximum heating position, the elastic insulator is deformed and compressed until the asperities are vanished and there is no gap between the seal surface and the air mix damper.

2. The vehicular air conditioner according to claim 1, wherein at least two lines of the asperity portions on the distal-end-side surface of the air mix damper are provided at predetermined intervals in a direction of air flow, and a protrusion provided on the seal surface on the unit case is contactable with a portion between the lines.

3. The vehicular air conditioner according to claim 1, wherein a thickness of the elastic insulator is larger than a vertical difference of the asperity portions formed on the distal-end-side surface of the air mix damper.

4. The vehicular air conditioner according to claim 3, wherein the thickness of the elastic insulator is at least twice as large as the vertical difference of the asperity portions.

* * * * *